United States Patent Office 2,972,615
Patented Feb. 21, 1961

2,972,615
PRODUCTION OF PYRIDINE

William I. Denton, Cheshire, Conn., assignor to Olin Mathieson Chemical Corporation, a corporation of Virginia No Drawing. Filed June 1, 1959, Ser. No. 817,056

5 Claims. (Cl. 260—290)

This invention relates to the preparation of pyridine and, more particularly, to a novel catalytic process for the production of pyridine.

Pyridine is an industrially important chemical primarily useful as an intermediate in the preparation of other chemical compounds having important applications in the pharmaceutical and chemical industries. Pyridine itself is useful as a solvent for organic materials such as fats and mineral oils and as a catalyst in certain specific organic reactions such as the hydration of olefins and the sulfonation of alcohols.

Pyridine is currently produced from coal tar which is a by-product of coking operations. Since the supply of coal tar is dependent upon the amount of coke prepared it is obvious that the amount of pyridine which can be obtained from this source is limited. Furthermore, the pyridine which is obtained as a by-product in the destructive distillation of coal tar is contaminated by various homologues which are formed at the same time. Hence, a separation problem is presented which entails considerable expense and inconvenience. Several synthetic methods for the preparation of pyridine have been reported. These generally involve either the reaction of acetaldehyde, methanol and ammonia or the reaction of oxygen-heterocyclic compounds with ammonia. In general, these methods have been unsatisfactory because of the poor yields of pyridine returned and because of the presence of other nitrogen-heterocyclic compounds in the reaction mixture. Among such processes, tetrahydrofurfuryl alcohol has been reacted with ammonia in the presence of various catalytic agents. The most effective of the catalysts which have been employed in this reaction have been molybdena-alumina and chromia-alumina catalysts. Of these the molybdena-alumina returned the highest yield of pyridine but its use was accompanied by the formation of excessive amounts of coke. Hence, the period for effective use of this catalyst was limited and frequent regeneration of the catalyst was necessary. The possibility of demands for increased quantities of pyridine have fostered attempts to improve upon those processes already known and to devise new methods for the preparation of pyridine.

It is an object of the present invention to provide a new and improved process for the preparation of pyridine.

It is another object of the present invention to provide an improved catalytic process for the preparation of pyridine.

It is a further object of this invention to provide an improved process for the production of pyridine in which a vanadia catalyst is employed.

Other objects will in part be obvious and will in part appear hereinafter.

It has been found that the above and other objects can be realized by the process of the present invention which comprises reacting tetrahydrofurfuryl alcohol with ammonia in the presence of a vanadia catalyst. In the preferred embodiment of the invention ammonia and tetrahydrofurfuryl alcohol in the mol ratio of from 3 to 1 to 7 to 1 are reacted at a temperature of from about 475° C. to 550° C. and at a pressure of from about 0.5 to about 10 atmospheres in the presence of a $V_2O_5$ on activated alumina catalyst, while introducing tetrahydrofurfuryl alcohol to the reaction zone at the rate of about 0.3 to .0 volumes per hour per unit volume of catalyst.

While the above conditions represent those which will be employed for achievement of optimum results, a certain degree of latitude in operating conditions is permissible in carrying out the process of the invention. Thus, the temperature can be varied from about 450° C. to about 600° C., although the preferred temperature of reaction is from about 475° C. to about 550° C. The particular temperature employed will of course depend to some degree upon the other conditions of reaction. For example, higher temperatures will be employed at short residence times whereas lower temperature should be employed at longer residence times.

Pressures of from about 0.1 to about 20 atmospheres can be employed in carrying out the process of the invention. As noted above, the preferred range of pressure is from about 0.5 to about 10 atmospheres.

While optimum molar ratio is from about 3 moles of ammonia to 1 mole of tetrahydrofurfuryl alcohol to about 7 moles of ammonia to 1 mole of tetrahydrofurfuryl alcohol, the mol ratio of ammonia to tetrahydrofurfuryl alcohol can be varied over the range of from about 2 moles of ammonia to 1 of tetrahydrofurfuryl alcohol to about 10 moles of ammonia to 1 mol of tetrahydrofurfuryl alcohol. At lower molar ratios the process operates satisfactorily but large amounts of the more expensive tetrahydrofurfuryl alcohol have to be processed, while at higher molar ratios the cost of handling and recovering additional ammonia become prohibitive.

Space velocity as used in this patent is liquid hourly space velocity. It is defined as the volume of tetrahydrofurfuryl alcohol which is supplied to the reaction zone per hour per unit volume of catalyst employed. The space velocity can be varied from about 0.1 to about 10, and is preferably maintained at from 0.3 to 2.0. It should be noted that the space velocity is based upon the principal reactant and is, therefore, not necessarily related to residence time since variations in the mole ratios of reactants or in the pressure can change the residence time without affecting the space velocity.

The catalyst which is employed is a vanadia catalyst and will ordinarily comprise vanadium pentoxide although the other lower oxides of vanadium may be employed. The catalyst support most frequently employed is bauxite or alumina, in activated or unactivated condition. However, other supports such as neutral or basic oxides can also be utilized. Examples of other suitable support materials are magnesia, basic aluminum phosphate, zinc spinels, zinc-alumina complexes and florisil. The concentration of the catalytic material on the support can be varied from about 2% to about 30%. In the preferred embodiment of the invention concentrations of about 6% to about 20% will be employed although lower concentrations are active. Higher concentrations, up to about 30%, give higher yields but the catalyst is more expensive and subject to breakage.

It is preferred that the ammonia which is employed be anhydrous, although aqueous ammonium hydroxide can be employed.

The advantages of the present invention in which a vanadia catalyst is employed reside in the combination of high yields with effective operation. Thus, it has been found that by carrying out the reaction of tetrahydrofurfuryl alcohols with ammonia in the presence of a vanadia catalyst instead of the chromia-alumina catalyst heretofore employed, better yields of pyridine are obtained. A comparison of the process employing a vanadia catalyst in place of the molybdena-alumina catalyst used in certain of the prior art processes shows that the deposition of coke on the catalyst is reduced by almost 50% when the vanadia catalyst is employed. Hence, it is possible to run the reaction employing a vanadia catalyst for a greatly extended period before the catalyst is poisoned to an extent requiring regeneration.

The following examples are given in order to more fully describe the invention but are not to be construed as limiting in any way the scope thereof.

EXAMPLE I

Preparation of catalyst

A 10% $V_2O_5$ on activated alumina catalyst was prepared in the following manner: 250 grams of activated alumina were placed in a two liter filter flask equipped with a dropping funnel. The alumina was evacuated for a period of one hour by means of a vacuum pump attached to the flask through a stopcock. At the end of this period, a solution of 35 grams of ammonium metavanadate in 750 cc. of distilled water was added to the dropping funnel. The stopcock was turned off and evacuation of the flask was discontinued. Then the solution of ammonium metavanadate was added in portions to the alumina in the flask with attendant stirring. At the completion of the addition, the alumina-catalyst solution was placed in an evaporating dish and evaporated to dryness with constant stirring. The catalyst was then heated in an oven at 150° C. for a period of 6 hours, after which it was heated at 500° C. for a period of 18 hours.

Preparation of pyridine

Tetrahydrofurfuryl alcohol and ammonia in the ratio of 5 moles of ammonia per mole of alcohol were passed over the catalyst whose preparation was described above for six hours at a space velocity of 0.5, a temperature of 500° C. and at atmospheric pressure. Pyridine was obtained in an amount of 41 mole percent based on the tetrahydrofurfuryl alcohol reactant. The amount of alcohol converted to coke amounted to 2.3 mole percent.

EXAMPLE II

Tetrahydrofurfuryl alcohol and ammonia in the mole ratio of 5 moles ammonia to 1 mole of alcohol were passed over a catalyst comprising 10% $V_2O_5$ on an alumina support for a period of 3 hours at a temperature of 525° C., a space velocity of 1.0 and at atmospheric pressure. Pyridine yield was 39 mole percent based on the alcohol, and 2.4 mole percent of the alcohol was converted to coke.

EXAMPLE III

A 20% $V_2O_5$ on activated alumina catalyst was prepared in the following manner: 125 grams of activated alumina (4–8 mesh) were placed in a 1,000 ml. filter flask and evacuated for 1½ hours. 35 grams of ammonium metavanadate were added to 750 cc. of distilled water which had been heated to 90° C. This hot solution was then added to the evacuated alumina support in five portions with shaking after each addition. The solution containing the catalyst was then evaporated to dryness, with constant stirring during evaporation. After evaporation the catalyst was placed in the oven at 150° C. overnight and then muffled at 500° C. for 16 hours.

Preparation of pyridine

Tetrahydrofurfuryl alcohol and ammonia in the mole ratio of 3.2 moles of ammonia to 1 mole of alcohol were passed over the catalyst whose preparation was described above for 3 hours at a space velocity of 1.0, a temperature of 525° C. and at atmospheric pressure. The yield of pyridine was 38% per pass while 3.7 mole percent of the charge was converted to coke.

EXAMPLE IV

In the following example, comparative runs were made under identical conditions in order to compare the catalysts employed in the process of the present invention with chromia-alumina and molybdena-alumina catalysts. All runs were made for a period of 3 hours duration at a temperature of 525° C., atmospheric pressure and a space velocity of 1.0. The mole ratio of ammonia to alcohol employed was 5 to 1. The results of these runs are set forth in the table below:

| Run No. | Catalyst | Pyridine Yield, Mole Percent Per pass | Coke on Catalyst, Mole Percent |
|---|---|---|---|
| 1 | 10% $V_2O_5$ on alumina | 39 | 2.4 |
| 2 | 4–8 mesh activated alumina | 16 | 1.6 |
| 3 | 20% chromia–80% alumina coprecipitated. | 24 | 1.3 |
| 4 | 10% $MoO_3$ on alumina | 44 | 4.3 |

EXAMPLE V

In the following example, comparative runs were made under substantially the same operating conditions in order to compare the catalyst employed in the process of the present invention with three additional metal oxide catalysts. The materials, conditions and results are those set forth in the table.

| Catalyst | | | | | | | |
|---|---|---|---|---|---|---|---|
| (a) Active Material | 10% $V_2O_5$ | 10% $WO_3$ | 10% $ThO_2$ | 10% $ZnO_2$ | Copper Chromite Catalyst | Cobalt Thoria Catalyst | 10% MoO |
| (b) Support | 90% $Al_2O_3$ | 90% $Al_2O_3$ | 90% $Al_2O_3$ | 90% $Al_2O_3$ | | | 90% Si-Al beads [2] |
| Operating Conditions: | | | | | | | |
| (a) Temp., °C | 525 | 525 | 525 | 525 | 525 | 525 | 525 |
| (b) Space Vel., v./hr./v | 1.0 | 1.0 | 1.0 | 1.0 | 1.0 | 1.0 | 1.0 |
| (c) Residence Time, sec | 0.9 | 0.9 | 0.9 | 0.9 | 0.9 | 0.9 | 0.9 |
| (d) Molar Ratio $NH_3$:THFA | 5.0 | 5.0 | 4.9 | 5.0 | 5.0 | 4.8 | 5.0 |
| (e) Pressure, Atmospheres | atm. | atm. | atm. | atm. | atm. | atm. | atm. |
| (f) Length of Run, Hrs.-Min | 3–0 | 3–0 | 4–0 | 3–0 | 3–0 | 3–0 | 3–0 |
| Yield, Mole Percent Based on THFA [1]: | | | | | | | |
| Pyridine, per pass | 39 | 20 | 16 | 21 | 0 | 0 | 3 |
| Pyridine, ultimate | 45 | 32 | 26 | 34 | | | 10 |
| Coke on Catalysts, per pass | 2.4 | 3.4 | 1.7 | 1.4 | 2.9 | 1.1 | 1.6 |

[1] THFA—Tetrahydrofurfuryl alcohol.
[2] Si-Al beads—Commercially available support which is acid in nature and which is formed from 90% $SiO_2$ and 10% $Al_2O_3$.

From the foregoing it is evident that the catalyst of the present invention gives superior results which are entirely distinct from the results achieved with other oxides both as to yield per pass and ultimate yield. Moreover these exceptional results are achieved without a substantial sacrifice in increased coke formation.

EXAMPLE VI

In this example, comparative runs were made using the catalyst of the present invention under substantially the same conditions for each run with the exception of temperature conditions. The temperature conditions used are those given in the following table. The catalyst used throughout was 10% V$_2$O$_5$ on 90% activated alumina.

| Operating Conditions: | | | | | |
|---|---|---|---|---|---|
| (a) Temperature, °C | 475 | 500 | 525 | 550 | 575 |
| (b) Space Velocity, v./hr./v | 1.0 | 1.0 | 1.0 | 1.0 | 1.0 |
| (c) Residence time, seconds | 0.9 | 0.9 | 0.9 | 0.9 | 0.8 |
| (d) Molar Ratio, NH$_3$:THFA | 5.1 | 5.1 | 5.0 | 5.1 | 5.0 |
| (e) Pressure, atmospheres | atm. | atm. | atm. | atm. | atm. |
| (f) Length of Run, hrs.-min | 3—0 | 3—0 | 3—0 | 3—0 | 3—0 |
| Yield, Mole Percent Based on THFA | | | | | |
| Pyridine, Per Pass | 23 | 34 | 39 | 34 | 21 |
| Pyridine, Ultimate | 31 | 42 | 45 | 39 | 26 |
| Coke in Catalyst, Per Pass | 1.7 | 1.9 | 2.4 | 2.8 | 2.7 |

From the results given in this table it is apparent that the method of the present invention gives exceptionally good results over a wide range of temperatures and that an optimum temperature occurs in the range of 500° to 525° C. for the particular operating conditions used here. Generally the range of about 475° to about 550° C. gives superior results as is also evident from the results given above for a particular set of operating conditions.

In general a lower ratio of ammonia to tetrahydrofurfuryl alcohol will result in a higher percentage of coke formation. This is illustrated particularly in Example III where a 3.7% coke formation per pass resulted from use of an ammonia to alcohol of only 3.2 whereas the higher molar ratios used in the other examples gave lower percentages of coke formation. With molybdena catalysts this increase in the rate of coke formation with decrease in the ratio of ammonia to alcohol is greater than the rate found when using vanadia catalyst. For example when two parallel runs were made using molybdena catalysts, and all conditions were maintained constant except molar ratio, a decrease of the molar ratio of ammonia to alcohol of about 50% resulted in an increase in the coke formation of greater than 100%.

The support used in connection with this invention should preferably have a surface area in excess of five square meters per gram as such supports have been found to yield the most efficient utilization of the catalyst deposited thereon. The supports used in the foregoing examples had surface areas in excess of 100 square meters per gram. A range of between 30 and 500 gives satisfactory active catalytic support. A preferred range is from about 100 to 300 for greatest efficiency.

This application is a continuation-in-part of application Serial Number 677,213, filed August 9, 1957, and now abandoned.

Since many examples of the foregoing procedures and articles may be carried out and made, and since many modifications can be made in the procedures and articles described without departing from the scope of the subject invention, the foregoing is to be interpreted as illustrative only, and not as defining or limiting the scope of the invention.

What is claimed is:

1. A process for the preparation of pyridine which comprises reacting ammonia and tetrahydrofurfuryl alcohol in the mole ratio of from 2:1 to 10:1 at a temperature of from about 450° C. to about 600° C., a pressure of from about 0.1 to about 20 atmospheres, and a space velocity of from about 0.1 to about 10, in the presence of a catalyst consisting essentially of from about 2% to 30% of a vanadium oxide on an inert solid support having a surface area in excess of five square meters per gram and selected from the group consisting of neutral and basic oxides.

2. A process according to claim 1 in which the vanadium oxide is vanadium pentoxide.

3. A process according to claim 1 in which the support is activated alumina.

4. A process for the preparation of pyridine in which ammonia and tetrahydrofurfuryl alcohol are reacted at a mole ratio of from about 3:1 to about 7:1, at a temperature of from about 475° C. to about 550° C., a pressure of from about 0.5 to about 10 atmospheres, and a space velocity of from about 0.3 to 2.0, in the presence of a catalyst consisting essentially of from about 6% to about 20% of a vanadium oxide on an inert solid support having a surface area in excess of five square meters per gram and selected from the group consisting of neutral and basic oxides.

5. A process for the preparation of pyridine which comprises reacting 5 moles of ammonia with 1 mole of tetrahydrofurfuryl alcohol at a temperature of 525° C., a pressure of 1 atmosphere, and a space velocity of 1, in the presence of a catalyst consisting essentially of 10% of vanadium pentoxide on an activated alumina support.

References Cited in the file of this patent

UNITED STATES PATENTS

| 2,206,773 | Hale | July 7, 1940 |
| 2,543,424 | Spillane et al. | Feb. 27, 1951 |

FOREIGN PATENTS

| 382,819 | Italy | Mar. 21, 1940 |
| 695,472 | Germany | Aug. 26, 1940 |